(12) United States Patent
Figueroa et al.

(10) Patent No.: US 8,947,599 B2
(45) Date of Patent: Feb. 3, 2015

(54) METHOD AND APPARATUS FOR ADJUSTING CHROMA AND LUMA FOR A VIDEO SIGNAL

(75) Inventors: Samuel A. Figueroa, Fremont, CA (US); Jay D. Zipnick, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 1427 days.

(21) Appl. No.: 11/803,919

(22) Filed: May 15, 2007

(65) Prior Publication Data

US 2008/0284915 A1 Nov. 20, 2008

(51) Int. Cl.
*H04N 9/64* (2006.01)
*H04N 9/67* (2006.01)
*H04N 9/68* (2006.01)
*H04N 5/14* (2006.01)

(52) U.S. Cl.
CPC . *H04N 9/67* (2013.01); *H04N 9/68* (2013.01); *H04N 5/14* (2013.01); *H04N 9/643* (2013.01)
USPC ........... 348/650; 348/649; 348/571; 348/599; 348/659; 348/661; 345/591; 345/593; 345/604

(58) Field of Classification Search
USPC .......... 348/650, 659–661, 571, 649; 345/591, 345/593, 604, 600, 603
See application file for complete search history.

(56) References Cited

U.S. PATENT DOCUMENTS

| | | | | |
|---|---|---|---|---|
| 6,462,786 | B1* | 10/2002 | Glen et al. | 348/599 |
| 7,301,543 | B2* | 11/2007 | Higgins | 345/589 |
| 2007/0086030 | A1* | 4/2007 | Kagawa et al. | 358/1.9 |
| 2008/0143739 | A1* | 6/2008 | Harris et al. | 345/604 |

* cited by examiner

*Primary Examiner* — Jefferey Harold
*Assistant Examiner* — Omer Khalid
(74) *Attorney, Agent, or Firm* — Park, Vaughan, Fleming & Dowler LLP

(57) ABSTRACT

A system that adjusts chroma and luma values for a video signal is presented. During operation, the system receives a matrix of coefficients, which when applied to the chroma values and the luma values of a video signal produces substantially the same result as performing a sequence of discrete operations on the chroma values and the luma values, wherein the sequence of discrete operations includes one or more color-representation-conversion operations and one or more processing amplifier operations. For a given pixel of the video signal, the system performs a matrix-multiplication operation between a matrix representation of the chroma values and the luma values for the given pixel and the matrix of coefficients to produce a modified pixel.

48 Claims, 2 Drawing Sheets

METHOD AND APPARATUS FOR ADJUSTING CHROMA AND LUMA FOR A VIDEO SIGNAL

BACKGROUND

1. Field of the Invention

The present invention relates to techniques for adjusting chroma and luma values for a video signal.

2. Related Art

Modern graphics processing units (GPUs) include dedicated hardware resources to efficiently perform computationally intensive graphics operations. Two such graphics operations are processing amplifier (proc amp) operations and color representation operations. A proc amp operation adjusts the hue, saturation, contrast, and brightness of a set of pixels. Color representation conversion operations convert the chroma and luma values of a set of pixels from one color representation to another color representation (e.g., from Y'CbCr to R'B'G'). In some cases, both a proc amp operation and one or more color representation conversion operations are required to process an image. In such cases, the graphics operations are typically serialized, wherein the GPU sequentially performs a series of discrete mathematical operations for each operation for each pixel. Unfortunately, even with powerful GPUs, performing these graphics operations across millions of pixels becomes computationally expensive and time consuming.

Hence, what is needed is a method and an apparatus for adjusting chroma and luma values for a video signal without the problems described above.

SUMMARY

One embodiment of the present invention provides a system that adjusts chroma and luma values for a video signal. During operation, the system receives a matrix of coefficients, which when applied to the chroma values and the luma values of a video signal produces substantially the same result as performing a sequence of discrete operations on the chroma values and the luma values, wherein the sequence of discrete operations includes one or more color-representation-conversion operations and one or more processing amplifier operations. For a given pixel of the video signal, the system performs a matrix-multiplication operation between a matrix representation of the chroma values and the luma values for the given pixel and the matrix of coefficients to produce a modified pixel.

In one embodiment, prior to receiving the matrix of coefficients, the system receives chroma adjustment values and luma adjustment values for the video signal. Next, the system receives one or more sets of color-representation-conversion formulas which can be used to convert the chroma values and the luma values between one or more color representations. The system then receives the sequence of discrete operations to be performed on the chroma values and the luma values for the video signal, wherein these discrete operations can be performed in any order. Next, the system calculates coefficients for the matrix of coefficients based on the chroma adjustment values, the luma adjustment values, the one or more color-representation-conversion formulas, and the sequence of discrete operations.

In one embodiment, the matrix of coefficients is calculated once for a given set of chroma adjustment values, luma adjustment values, color-representation-conversion formulas, and sequence of discrete operations.

In one embodiment, the one or more color representations can include: a RGB color representation; a R'G'B' color representation; a CMYK color representation; a YCbCr color representation; a Y'CbCr color representation; a YPbPr color representation; a Y'PbPr color representation; and any other color representation now known or later developed. Note that luma and chroma color representations are often referred to as "YUV" and "yuv."

In one embodiment, the chroma adjustment values and the luma adjustment values for the video signal can include adjustment values for: hue; saturation; contrast; brightness; and chroma offsets.

In one embodiment, the sequence of discrete operations includes: a first operation which adjusts the chroma values and the luma values for the given pixel, wherein the chroma values and the luma values are represented in a first color representation; and a second operation which converts the adjusted chroma values and the adjusted luma values for the given pixel from the first color representation to a second color representation.

In one embodiment, the sequence of discrete operations includes: a first operation which converts the chroma values and the luma values for the given pixel from the first color representation to a second color representation; a second operation which adjusts the chroma values and the luma values for the given pixel, wherein the chroma values and the luma values are represented in the second color representation; and a third operation which converts the adjusted chroma values and the adjusted luma values for the given pixel from the second color representation to a third color representation.

In one embodiment, the sequence of discrete operations includes: a first operation which converts the chroma values and the luma values for the given pixel from the first color representation to a second color representation; and a second operation which adjusts the chroma values and the luma values for the given pixel, wherein the chroma values and the luma values are represented in the second color representation.

In one embodiment, the sequence of discrete operations includes an operation which expands a numerical range for the chroma values and the luma values for the given pixel in a first color representation.

In one embodiment, the system performs the matrix-multiplication operation for one or more pixels in a video buffer.

In one embodiment, while performing the matrix-multiplication operation for one or more pixels in the video buffer, the system performs a number of matrix-multiplication operations in parallel.

In one embodiment, the system displays the modified pixel.

In one embodiment, the matrix representation of the chroma values and the luma values for the given pixel is a vector.

In one embodiment, the system performs one or more specified operations on the modified pixel prior to displaying the modified pixel.

In one embodiment, the coefficients are constants.

In one embodiment, the operations can be performed on one or more of: a central processing unit; a graphics processing unit; and any other processor now known or later developed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media.

Computer System

Figure 1:
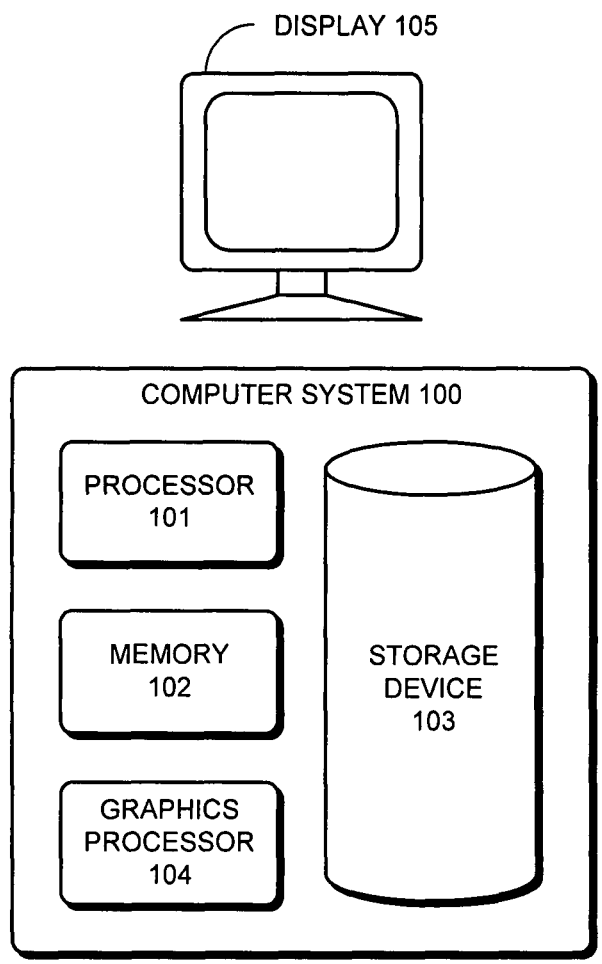
FIG. 1 illustrates a computer system in accordance with an embodiment of the present invention.

FIG. 1 illustrates a computer system 100 and a display 105 in accordance with an embodiment of the present invention. Computer system 100 includes processor 101, memory 102, storage device 103, and graphics processor 104.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, read only memory (ROM), and any other type of memory now known or later developed. Storage device 103 can include any type of non-volatile storage device that can be coupled to a computer system. This includes, but is not limited to, magnetic, optical, and magneto-optical storage devices, as well as storage devices based on flash memory and/or battery-backed up memory. Graphics processor 104 can include a dedicated processor which performs graphics operations on pixels. For example, graphics processor 104 can include, but is not limited to a graphics processing unit (GPU).

In one embodiment of the present invention, computer system 100 is coupled to display 105, which can display video signals generated by graphics processor 104.

Proc Amp Operations

Note that this specification describes the present invention in terms of gamma-corrected video signals, which are indicated with a "'" symbol. For example, a video signal represented in the YCbCr color representation that is gamma corrected is indicated by Y'CbCr. Also note that the present invention can be applied to any color representation regardless of whether it has been gamma corrected or not. While computer graphics often use an R'G'B' color representation with three unsigned color components, video usually is typically represented using an unsigned luma signal, Y', and two signed color difference signals, generically referred to as Cc. The Y' value can be calculated from R', G', and B' values, but the calculation differs slightly depending on the video standard. Often the color difference signals are based on B'−Y' and R'−Y', which are then typically scaled and encoded. When the color difference signals are scaled to a normalized range of {−0.5 ... +0.5}, they are often referred to as Pb and Pr. When performing computations involving colors, it is convenient to work with Y'PbPr values since all three components have a unity range (luma values have a range of {0 ... 1} and the chroma values are normalized to {−0.5 ... +0.5}).

A common Y'Cc encoding is Y'CbCr. This encodes Y'PbPr values in 8 or more bits with offset binary values for the chroma components. For 8-bit encoding the video range for Cb/Cr is {16 ... 240} and the video range for Y' is {16 ... 235}. The values below 16 are referred to as "footroom," and the values above 235 (for luma) and 240 (for chroma) are referred to as "headroom." The ITU-R BT. 601 standard reserves the values 0 and 255 (for 10 bit encoding: {0 ... 3} and {1020 ... 1023}) for synchronization signals.

Even when working with Y'CbCr values, there can be different "base equations" depending on the target white point of the video standard. So a Y'CbCr value may represent different colors depending on whether it is a standard definition or high definition (Rec. 709) color value.

In one embodiment of the present invention, a matrix-multiplication operation is used to transform an initial pixel value into a new pixel value. This operation is illustrated in Equation (1).

$$\begin{bmatrix} Y'_1 \\ C_1 \\ c_1 \end{bmatrix} = \begin{bmatrix} a_{00} & a_{01} & a_{02} \\ a_{10} & a_{11} & a_{12} \\ a_{20} & a_{21} & a_{22} \end{bmatrix} * \begin{bmatrix} Y' \\ C \\ c \end{bmatrix} \quad (1)$$

Note that Y', C, and c are the original values of a pixel represented in the Y'Cc color representation. $Y_1$, $C_1$, and $c_1$ are the modified/new values of the pixels in the Y'Cc color representation.

In one embodiment of the present invention, in addition to a matrix multiplication, an offset ($O_Y$, $O_C$, $O_c$) can be applied to each component value. This operation is illustrated in Equation (2), which illustrates the calculations necessary to implement a digital proc amp.

$$\begin{bmatrix} Y'_1 \\ C_1 \\ c_1 \end{bmatrix} = \begin{bmatrix} a_{00} & a_{01} & a_{02} \\ a_{10} & a_{11} & a_{12} \\ a_{20} & a_{21} & a_{22} \end{bmatrix} * \begin{bmatrix} Y' \\ C \\ c \end{bmatrix} + \begin{bmatrix} O_Y \\ O_C \\ O_c \end{bmatrix} \quad (2)$$

Before performing complex processing, consider performing the simplest operation on a pixel: nothing. This can be done using the identity matrix illustrated in Equation (3):

$$\begin{bmatrix} Y'_1 \\ C_1 \\ c_1 \end{bmatrix} = \begin{bmatrix} 1 & 0 & 0 \\ 0 & 1 & 0 \\ 0 & 0 & 1 \end{bmatrix} * \begin{bmatrix} Y' \\ C \\ c \end{bmatrix} \quad (3)$$

In one embodiment of the present invention, the slope of the luma component can be changed by multiplying the Y' component with $g_y$ (gain in luma). This operation is illustrated in Equation (4), which can be used to adjust contrast.

$$\begin{bmatrix} Y_1' \\ C_1 \\ c_1 \end{bmatrix} = \begin{bmatrix} g_y & 0 & 0 \\ 0 & 1 & 0 \\ 0 & 0 & 1 \end{bmatrix} * \begin{bmatrix} Y' \\ C \\ c \end{bmatrix} \quad (4)$$

In one embodiment, the Y' offset ($O_y$), which is the black level, can be changed by adding a DC offset to the luma component. This operation is illustrated in Equation (5), which can be used to adjust brightness.

$$\begin{bmatrix} Y_1' \\ C_1 \\ c_1 \end{bmatrix} = \begin{bmatrix} 1 & 0 & 0 \\ 0 & 1 & 0 \\ 0 & 0 & 1 \end{bmatrix} * \begin{bmatrix} Y' \\ C \\ c \end{bmatrix} + \begin{bmatrix} O_Y \\ 0 \\ 0 \end{bmatrix} \quad (5)$$

In one embodiment of the present invention, both brightness and contrast (black level and luma gain) can be changed using a single matrix multiply-add operation. These operations are illustrated in Equation (6).

$$\begin{bmatrix} Y_1' \\ C_1 \\ c_1 \end{bmatrix} = \begin{bmatrix} g_y & 0 & 0 \\ 0 & 1 & 0 \\ 0 & 0 & 1 \end{bmatrix} * \begin{bmatrix} Y' \\ C \\ c \end{bmatrix} + \begin{bmatrix} O_Y \\ 0 \\ 0 \end{bmatrix} \quad (6)$$

In one embodiment of the present invention, only the Cc coefficients are changed, thus giving a different slope to the chroma components. This operation is illustrated in Equation (7), which can be used to adjust saturation.

$$\begin{bmatrix} Y_1' \\ C_1 \\ c_1 \end{bmatrix} = \begin{bmatrix} 1 & 0 & 0 \\ 0 & g_C & 0 \\ 0 & 0 & g_c \end{bmatrix} * \begin{bmatrix} Y' \\ C \\ c \end{bmatrix} \quad (7)$$

Typically, the two gains $g_C$ and $g_c$ are the same. Hence, in one embodiment of the present invention, Equation (7) can be simplified to Equation (8) (saturation should be scaled by the contrast value).

$$\begin{bmatrix} Y_1' \\ C_1 \\ c_1 \end{bmatrix} = \begin{bmatrix} 1 & 0 & 0 \\ 0 & s & 0 \\ 0 & 0 & s \end{bmatrix} * \begin{bmatrix} Y' \\ C \\ c \end{bmatrix} \quad (8)$$

Note that when the saturation coefficients (chroma gains) in Equation (8) are set to zero, the matrix multiplication yields only the luma component. This results in a grayscale image since the color difference components are removed.

A rotation of the chroma components changes hue. Think of a fully saturated color along the outer edge of a color wheel. By moving along the outer edge of the color wheel, hue is changed. Equation (9) is the canonical form for rotation.

$$\begin{bmatrix} u_1 \\ v_1 \end{bmatrix} = \begin{bmatrix} \cos\theta & -\sin\theta \\ \sin\theta & \cos\theta \end{bmatrix} * \begin{bmatrix} u \\ v \end{bmatrix} \quad (9)$$

In one embodiment of the present invention, Equation (9) is applied to the chroma components to produce Equation (10).

$$\begin{bmatrix} Y_1' \\ C_1 \\ c_1 \end{bmatrix} = \begin{bmatrix} 1 & 0 & 0 \\ 0 & \cos\theta & -\sin\theta \\ 0 & \sin\theta & \cos\theta \end{bmatrix} * \begin{bmatrix} Y' \\ C \\ c \end{bmatrix} \quad (10)$$

Note that when the value of θ is zero, there is no hue rotation (i.e., this is the same as the identity matrix). As θ varies from 0 to 2π, a full rotation is accomplished. Typically, a television set hue control offers a much smaller degree of rotation.

In one embodiment of the present invention, for a given transformation, the contrast/saturation matrix can be concatenated with the hue matrix by pre-multiplying the two matrixes together. Equation (11) illustrates the combination of these operations.

$$\begin{bmatrix} g_y & 0 & 0 \\ 0 & s & 0 \\ 0 & 0 & s \end{bmatrix} * \begin{bmatrix} 1 & 0 & 0 \\ 0 & \cos\theta & -\sin\theta \\ 0 & \sin\theta & \cos\theta \end{bmatrix} = \begin{bmatrix} k_{00} & 0 & 0 \\ 0 & k_{11} & k_{12} \\ 0 & k_{21} & k_{22} \end{bmatrix} \quad (11)$$

This can be a substantial optimization if there are thousands of pixels to transform. Instead of 18 multiplications, there are only 9 multiplications. Furthermore, because there are four zero terms, the nine multiplications can be reduced to only five multiplications.

In one embodiment of the present invention, hue, saturation, contrast, brightness, and chroma offsets operations are combined into one matrix operation. This operation is illustrated in Equation (12).

$$\begin{bmatrix} Y_1' \\ C_1 \\ c_1 \end{bmatrix} = \begin{bmatrix} k_{00} & 0 & 0 \\ 0 & k_{11} & k_{12} \\ 0 & k_{21} & k_{22} \end{bmatrix} * \begin{bmatrix} Y' \\ C \\ c \end{bmatrix} + \begin{bmatrix} O_Y \\ O_C \\ O_c \end{bmatrix} \quad (12)$$

In one embodiment, all calculations, including those for the luma component, use signed arithmetic, and the final results are clamped. It may not at first be obvious that even the luma calculation should use signed arithmetic, but if the black level is adjusted below zero, then some luma values can become negative (before any clamping). Also, for special effects such as a video negative, the contrast can be made to be −1 and a positive offset of +1 can be added as the black level.

In one embodiment of the present invention, clamping can be used to keep the values within the wide component ranges, excluding reserved values (0 and 255 for 8-bit) for Y'CbCr ITU-R BT. 601 encoding. Thus, for this encoding, 8-bit values can range from 1 to 254. This allows for some values to extend into the headroom and footroom ranges. However, if the results are an intermediate operation, and more processing is performed, the clamping can keep values within the full component ranges. This allows for more precision to be maintained, and keeps the values mathematically pure. Thus, 8-bit values can range from 0 to 255, and a separate post-processing step may be added to remove ITU-R BT. 601 reserved values (0 and 255 for 8-bit encoding). Note that it is perfectly legal (and also very convenient) to allow for a frame buffer to have reserved values 0 and 255 so long as they are filtered before they are output on an ITU-R BT. 601 data stream. It is important to keep in mind that storage and transport are two separate concepts. It is up to the particular video processing application to consider these details when deciding to use full range, wide range, or possibly even video range clamping (video range would be 16 . . . 235 for 8-bit ITU-R BT. 601).

Because of the zero coefficients in the transformation matrix, the following operations plus any necessary clamping are sufficient to implement the digital proc amp calculations:

| Operation | Hue, Saturation, Contrast | Brightness, Chroma offset | Total |
| --- | --- | --- | --- |
| Multiplications | 5 | 0 | 5 |
| Additions | 2 | 3 | 5 |

Note that there are a number of optimizations that may be useful, but they will not help the general case. For example, if there is no hue rotation, then there are two additional zero values in the transformation matrix. If the brightness (black level offset) is zero, one addition can be saved. If there are no chroma offsets, two additions can be saved.

In one embodiment of the present invention, if an entire frame (or large section of a frame) of video is processed at one time, the transformation matrix values can be viewed as constants that are applied to thousands of pixels. Thus, the same parameters are applied many times to the pixel data. There are a number of optimizations outlined below that can take advantage of this.

On some hardware architectures, there may be more overhead for multiplications than a simple table lookup. In this case, a table can be generated to change each multiply-by-constant operation to a table lookup operation. For example if each component is 10-bits, then there will be 1024 possible multiplications for any component/constant term. Since there are five constant coefficients, five 1024-entry tables can be pre-generated, which are then applied to all the pixels in a frame. Since a frame has hundreds of thousands of pixels (more than 2 million in high definition), the table generation overhead is a relatively small price to pay when considering the total overall number of operations.

In one embodiment of the present invention, pre-multiplication can transform this operation from a matrix multiplication to table lookups:

$Y_1' = \text{table\_}k_{00}[Y'] + O_Y$ $C_1 = \text{table\_}k_{11}[C] + \text{table\_}k_{12}[c] + O_C$ $c_1 = \text{table\_}k_{21}[C] + \text{table\_}k_{22}[c] + O_C$ Since tables are used to generate intermediate results, the final vector addition can be optimized as offsets that are built into the tables. Each chroma offset can be added to one of two tables, which are added to the tables that form the diagonal of the transformation matrix. This is a good choice because if we ever consider a case where there is no hue parameter, table\_$k_{12}$ and table\_$k_{21}$ no longer exist (they would always be zero). Therefore, in one embodiment of the present invention, the $O_C$ offset is added to table\_$k_{11}$, the $O_c$ offset is added to table\_$k_{22}$, and $O_Y$ is added to table\_$k_{00}$.

This allows the entire transformation without clamping to be done using the following table lookup technique:

$Y_1' = \text{table\_}k_{00}[Y']$ $C_1 = \text{table\_}k_{11}[C] + \text{table\_}k_{12}[c]$ $c_1 = \text{table\_}k_{21}[C] + \text{table\_}k_{22}[c]$ Often the chroma components are encoded as offset binary values, but in the calculation domain they need to be two's complement. Therefore, a conversion from the encoding format (offset binary) to the calculation format (two's complement) may be necessary. In this case, one of two things can be done. In one embodiment of the present invention, each offset binary chroma sample is converted to two's complement before performing table lookups (requires an extra step). In one embodiment of the present invention, the four chroma tables are rotated such that the table lookup effectively performs the offset binary to two's complement for free. (In other words the top and bottom halves of the tables would be swapped.) This allows the overhead to take place once, in the table generation phase, instead of doing an offset binary to two's complement conversion for every chroma sample.

Since the transformed values can be obtained as the result of table lookups to derive partial sums, there is nothing restricting the tables to be based on linear transformations. Note that other techniques could combine non-linear transformations into the tables to perform other effects.

Proc Amp Operations and Color Representation Conversions

As previously mentioned, it is convenient to perform proc amp operations on pixels when they are represented in a Y'PbPr (or Y'CbCr) color representation. Since pixels can be represented in any number of color representations, a color representation conversion may also need to be performed. For example, pixels may be initially represented in the Y'CbCr color representation, but after performing proc amp operations, the pixels may need to be converted to a R'G'B' color representation so that they can be displayed on a video display. Similarly, the pixels may be initially represented in the R'G'B' color representation, and thus must be converted to Y'CbCr color representation so that the proc amp operations can be performed, and converted back into the R'G'B' color representation prior to being displayed.

The following exemplary formulas can be used to convert Y'CbCr values to R'G'B' values:

$R' = 1.402 * Cr + Y'$ $B' = 1.772 * Cb + Y'$ $G' = Y' - 0.714136 * Cr - 0.344136 * Cb$

Note that there are four multiplications and four additions (which are in addition to the multiplication and addition operations performed by the proc amp operation). Performing these operations across many pixels becomes expensive.

In one embodiment of the present invention, in order to reduce the number of operations performed, the color-representation-conversion and proc amp operations can be computed using a single matrix-multiplication operation.

Equations (13)-(15) expand the range of the color values.

$$Y_1' = \frac{255}{219} * \left(Y' - \frac{16}{255}\right) \quad (13)$$

$$Cr_1 = \frac{255}{224} * \left(Cr - \frac{128}{255}\right) \quad (14)$$

$$Cb_1 = \frac{255}{224} * \left(Cb - \frac{128}{255}\right) \quad (15)$$

Equations (16)-(18) are proc amp operations.

$Y_2' = G_I * Y_1' + Y_O$ \quad (16)

$Cr_2 = K \cos * Cr_1 + K \sin * Cb_1$ \quad (17)

$Cb_2 = K \cos * Cb_1 - K \sin * Cr_1$ \quad (18)

Where K cos and K sin are constants that are calculated from hue rotation values. $G_l$ is the gain in luma and $Y_O$ is the luma offset.

Equations (19)-(21) are color representation conversion formulas which convert color values from a Y'CbCr color representation to a R'G'B' color representation.

$$R'=1.402*Cr_2+Y_2' \quad (19)$$

$$B'=1.772*Cb_2+Y_2' \quad (20)$$

$$G'=Y_2'-0.714136*Cr_2-0.344136*Cb_2 \quad (21)$$

Note that equations (13)-(21) are exemplary equations, which depend on the particular color representations used.

Substituting equations (13)-(18) into equations (19)-(21) results in the following equations for R', B', and G':

$$R' = 1.402*\left(\frac{255}{224}\right)*K\cos*Cr + 1.402*\left(\frac{255}{224}\right)*K\sin*Cb + \quad (22)$$
$$G_l*\left(\frac{255}{219}\right)*Y' + Yo - 1.402*\left(\frac{128}{224}\right)*(K\cos + K\sin) - G_l*\left(\frac{16}{219}\right)$$

$$B' = 1.772*\left(\frac{255}{224}\right)*K\cos*Cb - 1.772*\left(\frac{225}{224}\right)*K\sin*Cr + \quad (23)$$
$$G_l*\left(\frac{255}{219}\right)*Y' + Yo + 1.772*\left(\frac{128}{224}\right)*(K\sin - K\cos) - G_l*\left(\frac{16}{219}\right)$$

$$G' = \left(\frac{255}{224}\right)*(0.344136*K\sin - 0.714136*K\cos)*Cr - \left(\frac{255}{224}\right)* \quad (24)$$
$$(0.344136*K\cos + 0.714136*K\sin)*Cb + G_l*\left(\frac{255}{219}\right)*Y' +$$
$$\left(\frac{128}{224}\right)*(0.714136*(K\cos + K\sin) + 0.344136*(K\cos - K\sin)) +$$
$$Yo - G_l*\left(\frac{16}{219}\right)$$

Note that in equations (22)-(24), the Y', Cb, and Cr values are multiplied by constants. Furthermore, if the constants are pre-computed, there are only 9 multiplication operations and 9 addition operations to perform per pixel. In one embodiment of the present invention, the proc amp and color representation conversion operations can be rewritten into a single matrix multiplication of the form:

$$[Y' \ Cr \ Cb \ 1] * \begin{bmatrix} C_{11} & C_{12} & C_{13} \\ C_{21} & C_{22} & C_{23} \\ C_{31} & C_{32} & C_{33} \\ C_{41} & C_{42} & C_{43} \end{bmatrix} = \begin{bmatrix} R' \\ G' \\ B' \end{bmatrix} \quad (25)$$

Since many GPUs have dedicated hardware resources to perform matrix operations, these calculations can be efficiently computed.

In one embodiment of the present invention, the coefficients $C_{ij}$ are calculated once and applied to every pixel in the video buffer.

This technique can be used for any number of operations. For example, consider a proc amp conversion that is applied to RGB input values.

Equations (26)-(28) convert R'G'B' color values to Y'CbCr color values:

$$Y'=0.299*R_i'+0.587*G_i'+0.114*B_i' \quad (26)$$

$$Cr=0.5*R_i'-0.418688*G_i'-0.0813124*B_i' \quad (27)$$

$$Cb=-0.168736*R_i'-0.331266*G_i'+0.5*B_i' \quad (28)$$

Equations (29)-(31) are proc amp operations.

$$Y_1'=G_l*Y'+Yo \quad (29)$$

$$Cr_1=K\cos*Cr+K\sin*Cb \quad (30)$$

$$Cb_1=K\cos*Cb-K\sin*Cr \quad (31)$$

Equations (32)-(34) are color representation conversion formulas which convert Y'CbCr color values to R'G'B' color values.

$$R'=1.402*Cr_1+Y_1' \quad (32)$$

$$B'=1.772*Cb_1+Y_1' \quad (33)$$

$$G'=Y_1'-0.714136*Cr_1-0.344136*Cb_1 \quad (34)$$

Note that equations (26)-(34) are exemplary equations, which depend on the particular color representations used.

Substituting equations (26)-(31) into equations (32)-(34) results in the following equations for R', B', and G':

$$R' = (0.701*K\cos - 0.2365679*K\sin + 0.299*G_l)*R_i' - \quad (35)$$
$$(0.587*K\cos + 0.4644349*K\sin - 0.587*G_l)*G_i' -$$
$$(0.114*K\cos - 0.701*K\sin - 0.114*G_l)*B_i' + Yo$$

$$B' = (-0.299*K\cos - 0.886*K\sin + 0.299*G_l)*R_i' - \quad (36)$$
$$(0.587*K\cos - 0.7419151*K\sin - 0.587*G_l)*G_i' +$$
$$(0.886*K\cos + 0.1440856*K\sin + 0.114*G_l)*B_i' + Yo$$

$$G' = (0.292568*K\sin - 0.299*(G_l - K\cos))*R_i' + \quad (37)$$
$$(0.413*K\cos + 0.0924834*K\sin + 0.587*G_l)*G_i' -$$
$$(0.114*K\cos + 0.3850505*K\sin - 0.114*G_l)*B_i' + Yo$$

Again, the initial R'G'B' color values (i.e., $R_i'$, $G_i'$, and $B_i'$) are multiplied by constants and the combined operations can be performed using a single matrix-multiplication operation.

Figure 2:
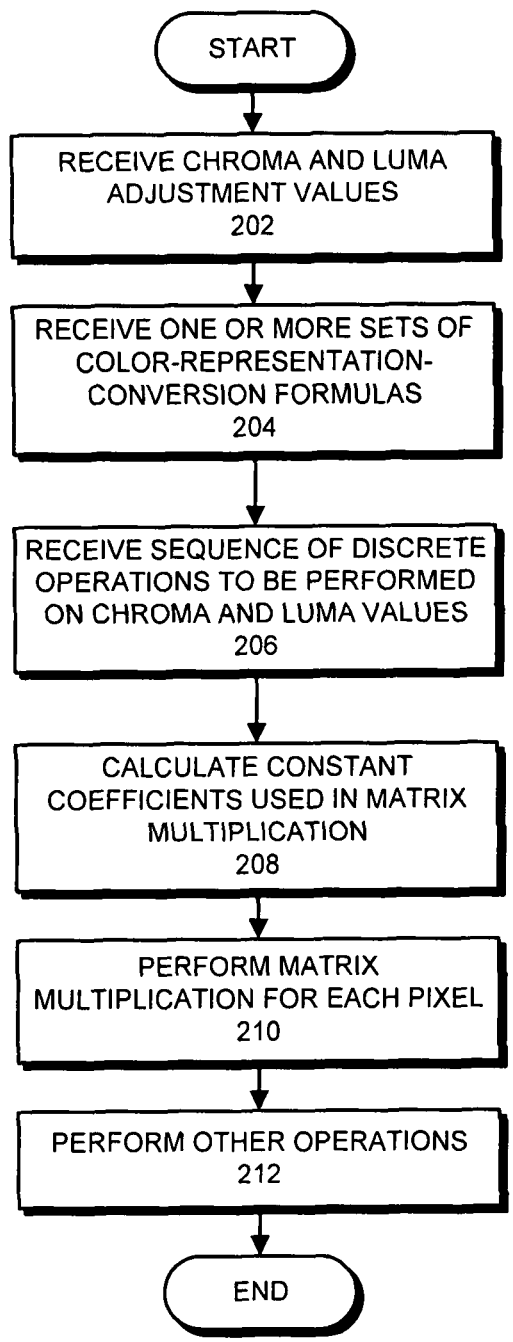
FIG. 2 presents a flow chart illustrating the process of adjusting chroma and luma values for a video signal in accordance with an embodiment of the present invention.

FIG. 2 presents a flow chart illustrating the process of adjusting chroma and luma values for a video signal in accordance with an embodiment of the present invention. The process begins when the system receives chroma adjustment values and luma adjustment values for a video signal (step 202). In one embodiment of the present invention, the chroma adjustment values and the luma adjustment values can include adjustment values for hue, saturation, contrast, brightness, and chroma offsets. Next, the system receives one or more sets of color-representation-conversion formulas which can be used to convert the chroma values and the luma values for the video signal between one or more color representations (step 204). The system then receives a sequence of discrete operations to be performed on the chroma values and the luma values for the video signal (step 206). Note that steps 202-206 can be performed in any order.

In one embodiment of the present invention, the one or more color representations can include: a RGB color representation; a R'G'B' color representation; a CMYK color representation; a YCbCr color representation; a Y'CbCr color representation; a YPbPr color representation; a Y'PbPr color representation; and any other color representation now known or later developed. Note that luma and chroma color representations are often referred to as "YUV" and "yuv."

Next, the system calculates coefficients for the matrix of coefficients based on the chroma adjustment values, the luma adjustment values, the one or more color representation conversion formulas, and the sequence of discrete operations (step 208). In one embodiment of the present invention, the matrix of coefficients is calculated once for a given set of:

chroma adjustment values, luma adjustment values, color representation conversion formulas, and sequence of discrete operations. In one embodiment of the present invention, the coefficients are constants for a given set chroma adjustment values and luma adjustment values.

In one embodiment of the present invention, for each pixel in a video buffer, the system performs a matrix-multiplication operation between a matrix representation of the chroma values and the luma values for the given pixel, and the matrix of coefficients to produce a modified pixel (step 210). In one embodiment of the present invention, a number of matrix-multiplication operations are performed in parallel. In another embodiment of the present invention, for each pixel in a video stream, the system performs a matrix-multiplication operation between a matrix representation of the chroma values and the luma values for the given pixel, and the matrix of coefficients to produce a modified pixel.

In one embodiment of the present invention, the system performs other operations on the pixels (step 212). For example, the system can perform a zoom operation to zoom into a section of a scene.

In one embodiment of the present invention, after performing the operations on the pixels, the system displays the modified pixels on a display.

In one embodiment of the present invention, these operations can be performed on one or more of: a central processing unit (CPU); a graphics processing unit (GPU); and any other processor now known or later developed. For example, the calculation of the matrix of coefficients can be performed by the CPU and the matrix multiplication can be performed by the GPU.

In one embodiment of the present invention, the techniques described above can be applied to: different color representations for the video signal; different color spaces for the video signal; different sampling frequencies for the video signal; different color encodings for the video signal; and to gamma-corrected and non-gamma-corrected video signals.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for adjusting chroma and luma values for a video signal, comprising:
   receiving a matrix of coefficients, which when applied to the chroma values and the luma values of a video signal produces substantially the same result as performing a sequence of discrete operations on the chroma values and the luma values, wherein the sequence of discrete operations includes one or more color-representation conversion operations and one or more processing amplifier operations, wherein at least one of the coefficients is a composite coefficient calculated using at least a combination of the one or more color-representation conversion operations and the one or more processing amplifier operations in the sequence of operations; and
   for a given pixel of the video signal, performing a matrix multiplication operation between a matrix representation of the chroma values and the luma values for the given pixel, and the matrix of coefficients to produce a modified pixel.

2. The method of claim 1, wherein prior to receiving the matrix of coefficients, the method further comprises:
   receiving chroma adjustment values and luma adjustment values for the video signal;
   receiving one or more sets of color-representation conversion formulas which can be used to convert the chroma values and the luma values between one or more color representations;
   receiving the sequence of discrete operations to be performed on the chroma values and the luma values; and
   calculating coefficients for the matrix of coefficients based on the chroma adjustment values, the luma adjustment values, the one or more color representation conversion formulas, and the sequence of discrete operations.

3. The method of claim 2, wherein the matrix of coefficients is calculated once for a given set of chroma adjustment values, luma adjustment values, color-representation conversion formulas, and sequence of discrete operations.

4. The method of claim 2, wherein the one or more color representations include at least one of:
   a RGB color representation;
   a R'G'B' color representation;
   a CMYK color representation;
   a YCbCr color representation;
   a Y'CbCr color representation
   a YPbPr color representation; or
   a Y'PbPr color representation.

5. The method of claim 2, wherein the chroma adjustment values and the luma adjustment values for the video signal include at least one adjustment value for:
   hue;
   saturation;
   contrast;
   brightness; or
   chroma offsets.

6. The method of claim 1, wherein the sequence of discrete operations includes:
   a first operation which adjusts the chroma values and the luma values for the given pixel, wherein the chroma values and the luma values are represented in a first color representation; and
   a second operation which converts the adjusted chroma values and the adjusted luma values for the given pixel from the first color representation to a second color representation.

7. The method of claim 1, wherein the sequence of discrete operations includes:
   a first operation which converts the chroma values and the luma values for the given pixel from the first color representation to a second color representation;
   a second operation which adjusts the chroma values and the luma values for the given pixel, wherein the chroma values and the luma values are represented in the second color representation; and
   a third operation which converts the adjusted chroma values and the adjusted luma values for the given pixel from the second color representation to a third color representation.

8. The method of claim 1, wherein the sequence of discrete operations includes:
   a first operation which converts the chroma values and the luma values for the given pixel from the first color representation to a second color representation; and
   a second operation which adjusts the chroma values and the luma values for the given pixel, wherein the chroma values and the luma values are represented in the second color representation.

9. The method of claim 1, wherein the sequence of discrete operations includes an operation which expands a numerical range for the chroma values and the luma values for the given pixel in a first color representation.

10. The method of claim 1, wherein the method further comprises performing the matrix multiplication operation for one or more pixels in a video buffer.

11. The method of claim 10, wherein performing the matrix multiplication operation for one or more pixels in the video buffer involves performing a number of matrix multiplication operations in parallel.

12. The method of claim 1, wherein the method further comprises displaying the modified pixel.

13. The method of claim 1, wherein the matrix representation of the chroma values and the luma values for the given pixel is a vector.

14. The method of claim 1, wherein the method further comprises performing one or more specified operations on the modified pixel prior to displaying the modified pixel.

15. The method of claim 1, wherein the coefficients are constants.

16. The method of claim 1, wherein the method can be performed on at least one of:
 a central processing unit; or
 a graphics processing unit.

17. A non-transitory computer-readable storage medium storing instructions that when executed by a computer cause the computer to perform a method for adjusting chroma and luma values for a video signal, wherein the method comprises:
 receiving a matrix of coefficients, which when applied to the chroma values and the luma values of a video signal produces substantially the same result as performing a sequence of discrete operations on the chroma values and the luma values, wherein the sequence of discrete operations includes one or more color-representation conversion operations and one or more processing amplifier operations, wherein at least one of the coefficients is a composite coefficient calculated using at least a combination of the one or more color-representation conversion operations and the one or more processing amplifier operations in the sequence of operations; and
 for a given pixel of the video signal, performing a matrix multiplication operation between a matrix representation of the chroma values and the luma values for the given pixel, and the matrix of coefficients to produce a modified pixel.

18. The non-transitory computer-readable storage medium of claim 17, wherein prior to receiving the matrix of coefficients, the method further comprises:
 receiving chroma adjustment values and luma adjustment values for the video signal;
 receiving one or more sets of color-representation conversion formulas which can be used to convert the chroma values and the luma values between one or more color representations;
 receiving the sequence of discrete operations to be performed on the chroma values and the luma values; and
 calculating coefficients for the matrix of coefficients based on the chroma adjustment values, the luma adjustment values, the one or more color representation conversion formulas, and the sequence of discrete operations.

19. The non-transitory computer-readable storage medium of claim 18, wherein the matrix of coefficients is calculated once for a given set of chroma adjustment values, luma adjustment values, color-representation conversion formulas, and sequence of discrete operations.

20. The non-transitory computer-readable storage medium of claim 18, wherein the one or more color representations include at least one of:
 a RGB color representation;
 a R'G'B' color representation;
 a CMYK color representation;
 a YCbCr color representation;
 a Y'CbCr color representation
 a YPbPr color representation; or
 a Y'PbPr color representation.

21. The non-transitory computer-readable storage medium of claim 18, wherein the chroma adjustment values and the luma adjustment values for the video signal include at least one adjustment value for:
 hue;
 saturation;
 contrast;
 brightness; or
 chroma offsets.

22. The non-transitory computer-readable storage medium of claim 17, wherein the sequence of discrete operations includes:
 a first operation which adjusts the chroma values and the luma values for the given pixel, wherein the chroma values and the luma values are represented in a first color representation; and
 a second operation which converts the adjusted chroma values and the adjusted luma values for the given pixel from the first color representation to a second color representation.

23. The non-transitory computer-readable storage medium of claim 17, wherein the sequence of discrete operations includes:
 a first operation which converts the chroma values and the luma values for the given pixel from the first color representation to a second color representation;
 a second operation which adjusts the chroma values and the luma values for the given pixel, wherein the chroma values and the luma values are represented in the second color representation; and
 a third operation which converts the adjusted chroma values and the adjusted luma values for the given pixel from the second color representation to a third color representation.

24. The non-transitory computer-readable storage medium of claim 17, wherein the sequence of discrete operations includes:
 a first operation which converts the chroma values and the luma values for the given pixel from the first color representation to a second color representation; and
 a second operation which adjusts the chroma values and the luma values for the given pixel, wherein the chroma values and the luma values are represented in the second color representation.

25. The non-transitory computer-readable storage medium of claim 17, wherein the sequence of discrete operations includes an operation which expands a numerical range for the chroma values and the luma values for the given pixel in a first color representation.

26. The non-transitory computer-readable storage medium of claim 17, wherein the method further comprises performing the matrix multiplication operation for one or more pixels in a video buffer.

27. The non-transitory computer-readable storage medium of claim 26, wherein performing the matrix multiplication operation for one or more pixels in the video buffer involves performing a number of matrix multiplication operations in parallel.

28. The non-transitory computer-readable storage medium of claim 17, wherein the method further comprises displaying the modified pixel.

29. The non-transitory computer-readable storage medium of claim 17, wherein the matrix representation of the chroma values and the luma values for the given pixel is a vector.

30. The non-transitory computer-readable storage medium of claim 17, wherein the method further comprises performing one or more specified operations on the modified pixel prior to displaying the modified pixel.

31. The non-transitory computer-readable storage medium of claim 17, wherein the coefficients are constants.

32. The non-transitory computer-readable storage medium of claim 17, wherein the method can be performed on at least one of:
   a central processing unit; or
   a graphics processing unit.

33. An apparatus that adjusts chroma and luma values for a video signal, comprising:
   a processor configured to:
   receive a matrix of coefficients, which when applied to the chroma values and the luma values of a video signal produces substantially the same result as performing a sequence of discrete operations on the chroma values and the luma values, wherein the sequence of discrete operations includes one or more color-representation conversion operations and one or more processing amplifier operations, wherein at least one of the coefficients is a composite coefficient calculated using at least a combination of the one or more color-representation conversion operations and the one or more processing amplifier operations in the sequence of operations; and
   for a given pixel of the video signal, to perform a matrix multiplication operation between a matrix representation of the chroma values and the luma values for the given pixel, and the matrix of coefficients to produce a modified pixel.

34. The apparatus of claim 33, wherein prior to receiving the matrix of coefficients, the processor is configured to:
   receive chroma adjustment values and luma adjustment values for the video signal;
   receive one or more sets of color-representation conversion formulas which can be used to convert the chroma values and the luma values between one or more color representations;
   receive the sequence of discrete operations to be performed on the chroma values and the luma values; and to
   calculate coefficients for the matrix of coefficients based on the chroma adjustment values, the luma adjustment values, the one or more color-representation conversion formulas, and the sequence of discrete operations.

35. The apparatus of claim 34, wherein the matrix of coefficients is calculated once for a given set of chroma adjustment values, luma adjustment values, color-representation conversion formulas, and sequence of discrete operations.

36. The apparatus of claim 34, wherein the one or more color representations include at least one of:
   a RGB color representation;
   a R'G'B' color representation;
   a CMYK color representation;
   a YCbCr color representation;
   a Y'CbCr color representation
   a YPbPr color representation; or
   a Y'PbPr color representation.

37. The apparatus of claim 34, wherein the chroma adjustment values and the luma adjustment values for the video signal include one or more adjustment value for:
   hue;
   saturation;
   contrast;
   brightness; or
   chroma offsets.

38. The apparatus of claim 33, wherein the sequence of discrete operations includes:
   a first operation which adjusts the chroma values and the luma values for the given pixel, wherein the chroma values and the luma values are represented in a first color representation; and
   a second operation which converts the adjusted chroma values and the adjusted luma values for the given pixel from the first color representation to a second color representation.

39. The apparatus of claim 33, wherein the sequence of discrete operations includes:
   a first operation which converts the chroma values and the luma values for the given pixel from the first color representation to a second color representation;
   a second operation which adjusts the chroma values and the luma values for the given pixel, wherein the chroma values and the luma values are represented in the second color representation; and
   a third operation which converts the adjusted chroma values and the adjusted luma values for the given pixel from the second color representation to a third color representation.

40. The apparatus of claim 33, wherein the sequence of discrete operations includes:
   a first operation which converts the chroma values and the luma values for the given pixel from the first color representation to a second color representation; and
   a second operation which adjusts the chroma values and the luma values for the given pixel, wherein the chroma values and the luma values are represented in the second color representation.

41. The apparatus of claim 33, wherein the sequence of discrete operations includes an operation which expands a numerical range for the chroma values and the luma values for the given pixel in a first color representation.

42. The apparatus of claim 33, wherein the processor is configured to perform the matrix multiplication operation for one or more pixels in a video buffer.

43. The apparatus of claim 42, wherein while performing the matrix multiplication operation for one or more pixels in the video buffer, the processor is configured to perform a number of matrix multiplication operations in parallel.

44. The apparatus of claim 33, wherein the processor is configured to display the modified pixel.

45. The apparatus of claim 33, wherein the matrix representation of the chroma values and the luma values for the given pixel is a vector.

46. The apparatus of claim 33, wherein the processor is configured to perform one or more specified operations on the modified pixel prior to displaying the modified pixel.

47. The apparatus of claim 33, wherein the coefficients are constants.

48. The apparatus of claim 33, wherein the processor is at least one of:
   a central processing unit; or
   a graphics processing unit.

* * * * *